United States Patent
Meysenc et al.

(10) Patent No.: US 9,461,467 B2
(45) Date of Patent: Oct. 4, 2016

(54) SYSTEM FOR SUPPLYING DIRECT ELECTRIC POWER FOR AT LEAST TWO LOADS FROM AN ALTERNATING ELECTRIC POWER SOURCE AND METHOD FOR STARTING SUCH A SUPPLY SYSTEM

(71) Applicant: SCHNEIDER ELECTRIC INDUSTRIES SAS, Rueil-Malmaison (FR)

(72) Inventors: Luc Meysenc, Mens (FR); Daniel Barstz, Grenoble (FR); Frederic Waterlot, St. Baldoph (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 401 days.

(21) Appl. No.: 14/086,373

(22) Filed: Nov. 21, 2013

(65) Prior Publication Data
US 2014/0152095 A1    Jun. 5, 2014

(30) Foreign Application Priority Data
Nov. 30, 2012    (FR) ...................................... 12 61501

(51) Int. Cl.
*H02J 1/00* (2006.01)
*H02J 3/14* (2006.01)
*H02J 5/00* (2016.01)

(52) U.S. Cl.
CPC .. *H02J 1/00* (2013.01); *H02J 3/14* (2013.01); *H02J 5/00* (2013.01); *Y02B 70/3225* (2013.01); *Y04S 20/222* (2013.01); *Y10T 307/297* (2015.04); *Y10T 307/406* (2015.04)

(58) Field of Classification Search
CPC ..................................................... H02J 13/001
USPC ................................................................ 307/82
See application file for complete search history.

(56) References Cited

U.S. PATENT DOCUMENTS

| 2002/0070609 A1 | 6/2002 | Aubry |
| 2003/0085689 A1 | 5/2003 | Berneis et al. |
| 2005/0012396 A1* | 1/2005 | Chidambaram ...... H02J 13/001 307/77 |

FOREIGN PATENT DOCUMENTS

EP    1 213 814 A1    6/2002

OTHER PUBLICATIONS

French Preliminary Search Report issued Aug. 30, 2013, in French Application No. 12 61501 filed Nov. 30, 2012 (with English Translation of Categories of Cited Documents).

*Primary Examiner* — Robert Deberadinis
(74) *Attorney, Agent, or Firm* — Oblon, McClelland, Maier & Neustadt, L.L.P.

(57) ABSTRACT

The invention relates to a system for supplying direct electric power to at least two loads from an alternating electric power source comprises a circulation bus for the alternating power adapted to be connected to the alternating power source and at least one converter for converting alternating power into direct power, connected to the circulation bus.

The system further comprises at least two connection interfaces, each connection interface being connected to a corresponding converter and being adapted to be connected to at least one electric load to supply direct electric power for the or each corresponding load; and means for controlling the connection interfaces, the control means being capable of time-shifting the start-up moment for the supply of direct power from one interface to the other.

13 Claims, 5 Drawing Sheets

SYSTEM FOR SUPPLYING DIRECT ELECTRIC POWER FOR AT LEAST TWO LOADS FROM AN ALTERNATING ELECTRIC POWER SOURCE AND METHOD FOR STARTING SUCH A SUPPLY SYSTEM

BACKGROUND OF THE INVENTION

The present invention relates to a system for supplying direct electric power for at least two loads from an alternating electric power source. The system comprises a circulation bus for the alternating electric power adapted to be connected to the alternating electric power source and at least one AC-DC converter, connected to the circulation bus.

The present invention also relates to a method for starting up such a system for supplying direct electric power for at least two loads.

Starting an installation for supplying direct electric power, or restarting it for example after power has been cut, is not without problems. In fact, each load needs time to charge its capacitances, which is often different from one mode to another and delays the start-up of the load.

The loads are for example communication switches, gateways, machines, data servers, and protective devices.

To correctly start or restart such an installation, there is generally a preferred order, as described hereinafter. Upon start-up, the switches, for example Ethernet switches or gateways, are powered first. Next, the machines, then the variable-frequency drives must be powered. Depending on the installation, the relays, and the protective and command control devices are then powered. An installation including these different loads must therefore be started or restarted by an expert very familiar with the connections of the different loads to the power supply system as well as the start-up times for each of the loads, so as to start each load at the appropriate time. Starting or restarting such an installation may then take several hours.

SUMMARY OF THE INVENTION

The aim of the invention is therefore to propose a system for supplying direct electric power to at least two loads allowing faster restarting, while not requiring the presence of an expert.

To that end, the invention relates to a system for supplying direct electric power for at least two loads, from an alternating electric power source, the system comprising:
  a circulation bus for the alternating power adapted to be connected to the alternating power source;
  at least one converter for converting alternating power into direct power, connected to the circulation bus;
  at least two connection interfaces, each connection interface being connected to a corresponding converter and being adapted to be connected to at least one electric load to supply direct electric power for the or each corresponding load; and
  control means for controlling the connection interfaces, the control means being capable of time-shifting the start-up moment for the supply of direct power from one interface to the other.

According to other advantageous aspects of the invention, the power supply system comprises one or more of the following features, considered alone or according to any technically possible combination:
  the alternating electric power source is an AC source, and each converter is connected to the circulation bus by means of a current transformer;
  the alternating electric power source is an alternating voltage source, and each converter is connected to the circulation bus by a voltage transformer;
  the connection interfaces comprise at least one controllable switch and the control means are capable of controlling the closing of the or each controllable switch;
  the control means are capable of sending a closing signal to the or each switch based on the received power supply start-up signal;
  the closing signal controls a time delay means specific to each respective connection interface;
  the system comprises an alternating electric power source, said alternating electric power source being capable of emitting the power supply start-up signal;
  the power supply start-up signal is a wireless signal, and the control means include a wireless receiver;
  the power supply start-up signal is an electric power signal transmitted via the circulation bus of the alternating electric power;
  the system comprises two circulation buses for the alternating electric power, adapted to be connected in parallel to two alternating electric power sources, the or each converter being connected to the two circulation buses; and
  the connection interfaces are adapted to be connected to multiple loads using a current bar.

The invention also relates to a method for starting up a direct electric power supply system for at least two loads, the system comprising an alternating electric power circulation bus, at least one converter for converting alternating power into direct power, at least two connection interfaces being connected to a corresponding converter and being adapted to be connected to at least one electric load to supply direct power to the or each corresponding load,
  the method comprising the following steps:
    starting the circulation of the alternating electric power in the circulation bus;
    time-shifting the startup moment of the direct power supply from one interface to the other, the shift being controlled by control means.

BRIEF DESCRIPTION OF THE DRAWINGS

The features and advantages of the invention will appear upon reading the following description, provided solely as a non-limiting example, and done in reference to the appended drawings, in which.

DETAILED DESCRIPTION OF PREFERRED EMBODIMENTS

Figure 1:
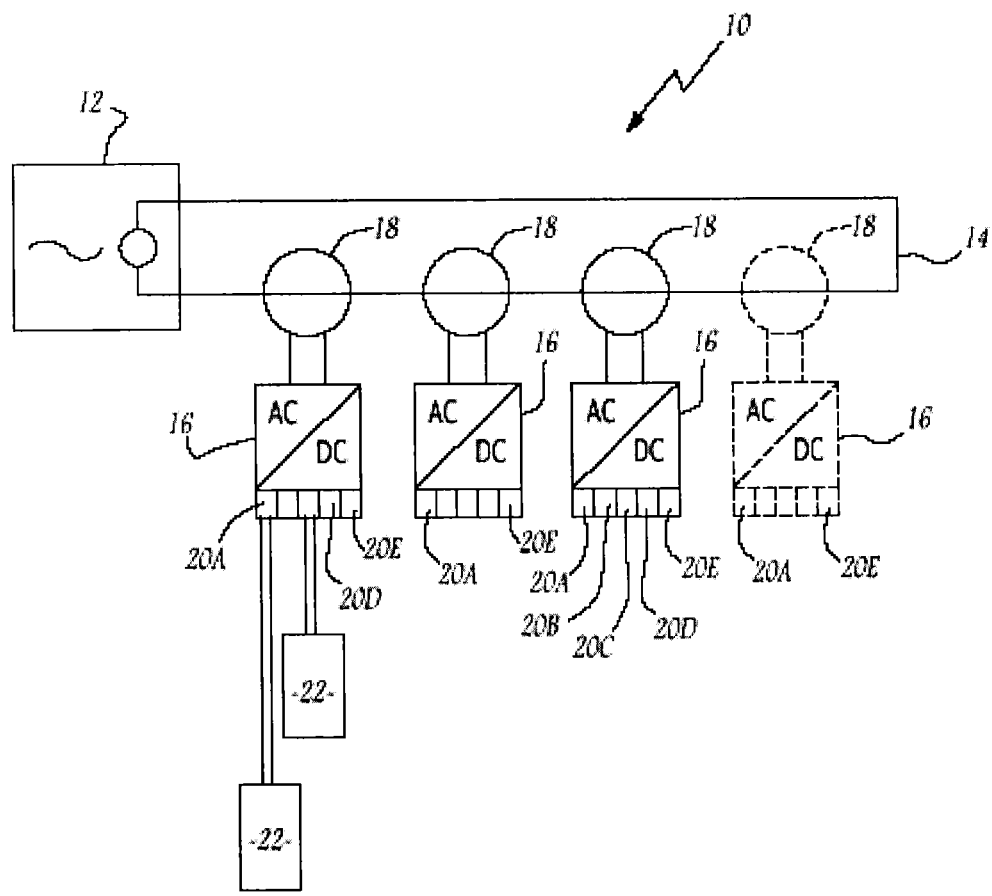
FIG. 1 is a diagrammatic illustration of a power supply system according to the invention, connected to an AC source and comprising several converters for converting alternating power into direct power.

In FIG. 1, a power supply system 10 is connected to an AC source 12. The power supply system 10 comprises a circulation bus 14 for the alternating electric power connected to the AC source 12, at least one converter for converting alternating power into direct power 16 connected to the circulation bus 14 via a current transformer 18, and at least two connection interfaces 20A, 20B, 20C, 20D, 20E, each connection interface 20A, . . . , 20E being connected to a corresponding converter 16 on the one hand, and being able to be connected to one or more electric loads 22 on the other hand.

Figure 3:
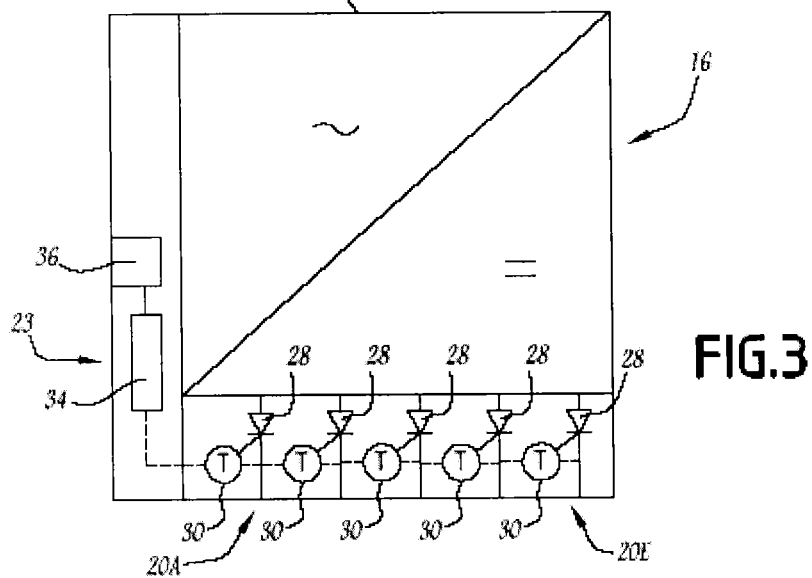
FIG. 3 is an electrical diagram of the connection interfaces of FIG. 2 and control means of those connection interfaces.

The power supply system 10 further comprises means 23 for controlling connection interfaces 20A, . . . , 20E, the control means 23, shown in FIG. 3, being capable of time-shifting the start-up moment of the supply of direct power from one connection interface to the other.

In the example embodiment of FIG. 1, the power supply system 10 comprises three converters 16 and three current transformers 18 connecting each converter 16 to the circulation bus 14, which is a current loop. The power supply system 10 for example comprises, for each converter 16, five connection interfaces 20A, 20B, 20C, 20D, 20E, i.e., a first connection interface 20A, a second connection interface 20B, a third connection interface 20C, a fourth connection interface 20D and a fifth connection interface 20E. In FIG. 1, a fourth converter 16 is shown in dotted lines so as to indicate that other converters 16 may be connected to the circulation loop 14.

The system 10 is for example a low-voltage system, capable of providing voltages comprised between 110 V and 600 V to the loads 22.

The AC source 12 is for example a regulated power supply capable of adapting the supply voltage of the loop 14 so as to provide the necessary current. The current capable of circulating in the loop 14 is then kept at the desired level owing to the regulated power supply 12.

In the example embodiment of FIG. 1, the loop 14 allows the circulation of an alternating current. The loop 14 is for example made by a high-voltage cable. The high-voltage cable includes a conductor with a metal inside, which is suitable for carrying an alternating current with a relatively high value, and several insulating layers, not shown. The high-voltage cable has insulation up to 10 to 12 kV. The use of such a cable for the circulation loop 14 makes it possible to distribute the power with a high and cost-effective insulation level.

Each converter for converting alternating power into direct power 16, also called rectifier, is known in itself. Each converter 16 is connected on the alternating side to the circulation loop 14 via a corresponding current transformer 18, and on the direct side to one or more connection interfaces 20A, . . . , 20E.

Each current transformer 18 is for example a toroid in which the loop 14 passes. Current transformers 18, in which the toroid opens like a clamp, are known. These current transformers 18 can therefore be positioned around the loop 14 without the current being interrupted (hot-plug).

Depending on the dimensioning of the toroids 18 in terms of the number of turns and the section of the conductors of those turns, the transformation ratio varies. The voltage is for example equal to 12 V if each toroid takes 500 mA in 24 V of DC voltage under a rated current of 10 A in the loop 14, with ten converters 16 each connected to the loop 14 via a corresponding toroid 18.

Each connection interface 20A, . . . , 20E is adapted to be connected to one or more electric loads 22 to supply direct power to the or each corresponding load.

Figure 2:
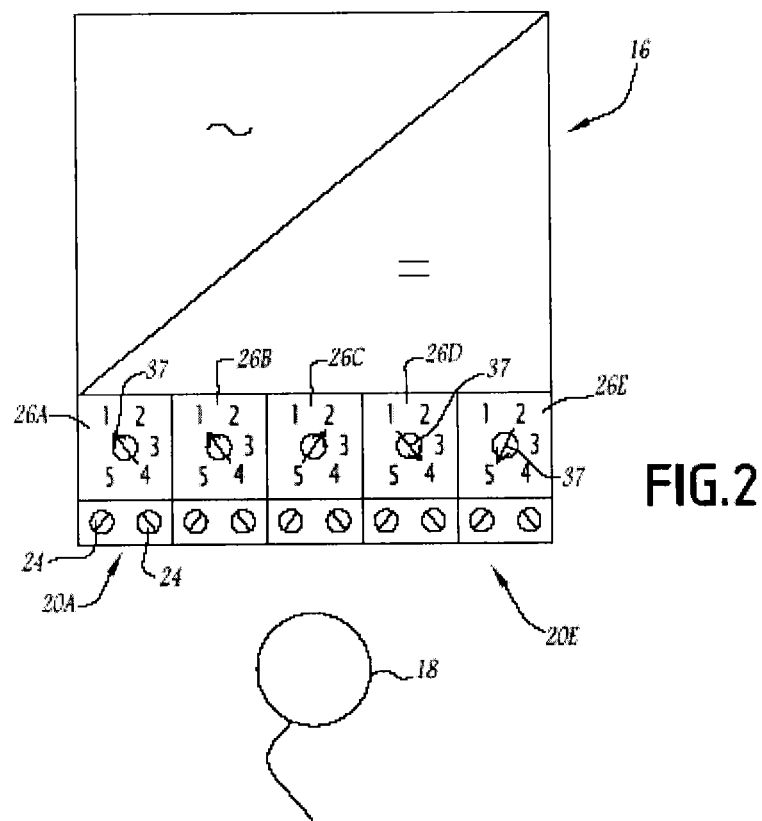
FIG. 2 is a diagrammatic illustration of a converter FIG. 1, connected to five connection interfaces.

Each connection interface 20A, . . . , 20E includes two connection terminals 24 and a selection means 26A, . . . , 26E as shown in FIG. 2. The two connection terminals 24 correspond to a positive connection terminal and a negative connection terminal, which allows the connection of at least one load 22 per connection interface 20A, . . . , 20E.

In one alternative not shown, each connection interface 20A, . . . , 20E includes a single connection terminal 24, and the system 10 further includes an electric ground shared by all of the connection interfaces 20A, . . . , 20E.

In another alternative is not shown, each connection interface 20A, . . . , 20E includes two connection terminals 24, i.e., a positive connection terminal and a negative connection terminal, and all of the negative connection terminals are connected to a shared electric ground, not shown.

Each connection interface 20A, . . . , 20E includes a switch 28 and a time delay means 30, as shown in FIG. 3, which illustrates an electrical diagram of the connection interfaces 20A, . . . , 20E and the selection means 26.

The electric loads 22 are for example communication switches, gateways, machines, data servers, or protective devices.

The control means 23 comprises a controller 34 and a communication interface 36 capable of receiving a power supply start-up signal and transmitting it to the controller 34.

The selection means 26A, . . . , 26E allow the selection of a predefined start-up delay using a selector 37, for example between a position "1" and a position "5". The selection means 26A, . . . , 26E include at least two distinct positions. The selector 37 is for example a manual selector.

The switch 28 is for example a transistor, a thyristor or any other electronically controllable switch. The switch 28 is capable of allowing the circulation of the direct power from the converter 16 to the corresponding connection terminals 24 when it is in the closed position, and interrupting that circulation when it is in the open position.

The time delay means 30 is for example an electronic time delay means. The electronic time delay means 30 for example includes a microcontroller, not shown, capable of managing the time delay and selecting the value of said time delay as a function of the position of the selector 37.

Each time delay means 30 is capable of implementing a variable-duration time delay from one time delay means to the next. The time delay has a value for example comprised between 0 seconds and 60 seconds.

The time delay means 30 are connected between the switches 28 and the control means 23. The time delay means 30 are controlled by the selection means 26. The time delay means 30 for example have a predetermined number of predefined time delay values, each predefined time delay value being associated with a respective position of the selection means 26.

The controller 34 is capable of receiving a power supply start-up signal via the communication interface 36. The controller 34 is connected to the time delay means 30, as shown in dotted lines in FIG. 3.

The communication interface 36 is, for example, a wireless interface capable of receiving a wireless power supply start-up signal. Alternatively, the communication interface 36 is a cabled interface capable of receiving an electrical power supply start-up signal, for example via the current transformer 18.

The system 10 operates as follows. During the deployment of the power supply system 10, a start-up time delay is chosen for each connection interface 20A, . . . , 20E, i.e., for each electric charge 22 or each group of charges 22 connected to the corresponding connection interface. As an example, position "1" of the selection means 26 corresponds to a startup of the load 22 one second after receiving the control signal from the controller 34. Position "2" as an example represents a startup time delay of 10 seconds as of reception of the control signal. Similarly, position "3" corresponds to a startup 30 seconds after receiving said control signal, position "4" to a startup after 40 seconds, and position "5" to a startup after 50 seconds. Of course, other time delay values are possible. The suitable time delay for a load is chosen during deployment of the installation system 10, i.e., upon connection of a load 22 to a given converter 16. The time delay can be modified later by simply changing the position of the selector 37 on the selection means 26.

As an example, an Ethernet switch is connected to the connection interface 20A of a converter 16. The corresponding selection means 26A is then set to position "1", since a switch must be powered first. A machine is connected to the connection interface 20B of the same converter 16. The corresponding selection means 26B is set to position "2" to ensure that the machine starts after the Ethernet switch. A variable-frequency drive is connected to the connection interface 20C. The corresponding selection means 26C is then set to position "3" so that the variable-frequency drive starts up after the switch and the machine. A relay, such as the so-called intelligent relays, which must start up after the Ethernet switch, the machine and the variable-frequency drive, is connected to the interface 20D. The selection means 26D is then set to position "4". Lastly, a protective device is connected to the interface 20E. It must start last, and the selection means 26E is then set to position "5". The start-up moments of each load 22 are thus for example chosen during the connection of the different loads 22, which can all be modified later.

Figure 4:
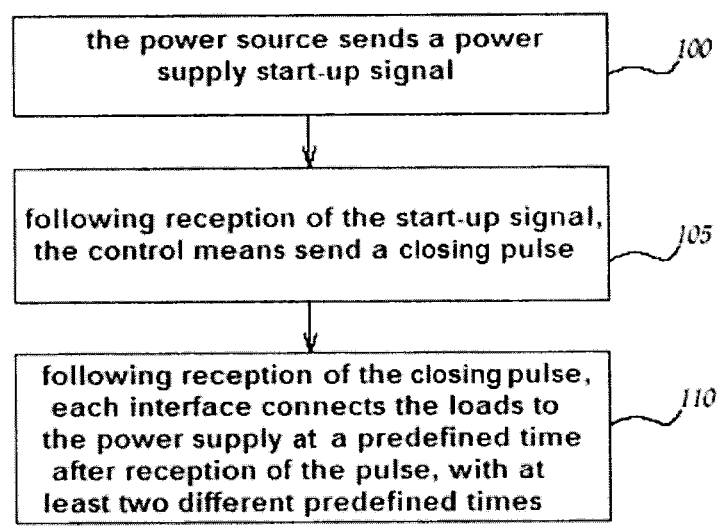
FIG. 4 is a flowchart of a method for starting up the power supply system according to the invention.

FIG. 4 shows a flowchart of the steps of a start-up method. During the initial step 100, upon starting up the system 10, i.e., when the power source 12 begins to supply alternating electric power to the circulation bus, a power supply start-up signal is sent. The power supply start-up signal is, for example, sent by the power source 12.

The power supply start-up signal is for example sent at the end of a self-test, also called internal check, of the power source 12.

The power supply start-up signal is transmitted via the current loop 14 and the current transformers 18 to the controller 34, passing through the communication interface 36. Also alternatively, the transmission of the start-up signal is done by power line carrier (PLC).

Alternatively, as previously indicated, the start-up signal is for example a wireless signal transmitted directly by radio waves between the power source 12 and the communication interface 36. The wireless signal is for example in accordance with the ZigBee protocol, communication protocol based on IEEE standard 802.15.4. It is advantageous in systems 10 with a large number of converters 16.

During a second step 105, following reception of the start-up signal, the control means 23, and more specifically the controller 34, sends a closing pulse to the switches 28, or more specifically to the time delay means 30 associated with the switches 28. If several converters 16 are connected to the bus 14, all of the controllers 34 of all of the converters 16 send a closing pulse to the time delay means 30 following reception of the start of signal. Alternatively, the closing pulse is also generated by the current transformer(s) 18, then simply retransmitted by the controllers 34.

The power supply start-up signal therefore allows synchronization of the different converters 16 and the different connection interfaces 20A, . . . , 20E. Loads 22 connected to different converters 16, but whereof the connection interfaces 20A, . . . , 20E all have an identical time delay selection, will then all started the same time.

The closing pulse commands the time delay means 30 of each connection interface 20A, . . . , 20E. The time delay means 30 simultaneously receive the closing pulse and then individually, and based on the selected time delay, command the closing of the corresponding switch 28. The load 22 is then supplied with direct voltage after expiration of the predefined time delay (step 110).

One can thus see that with the power supply system 10 according to the invention, it suffices to determine the start-up moments of the different loads 22 during deployment of the system 10. Each start-up or restart is then done in the initially provided chronological order. The expert accounts for the different capacitances to be loaded in the different loads 22 and the desired startup order of the different loads 22 during the design of the system. Starting up the system 10 then only requires approximately between one and five or ten minutes. Conversely, the time for a complete restart of the power supply system of the state of the art may take several hours of various manipulations and connections done manually by the operator.

The power supply system 10 thus facilitates the design of secondary power supply grids, and makes it possible to modify the start-up order of the loads 22 without disconnecting cables. This power supply system 10 thus facilitates the addition of communicating device(s) in an electric board without adding new secondary power supplies.

Figure 5:
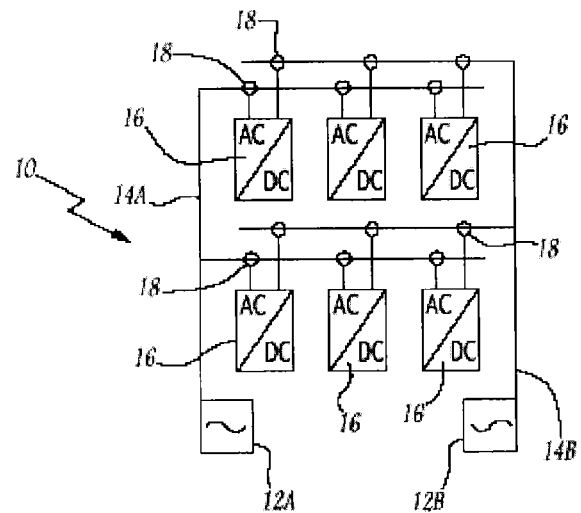
FIG. 5 is a view similar to that of FIG. 1 according to a second embodiment, the power supply system comprising two electric power circulation buses.

FIG. 5 illustrates a second embodiment of the invention in which the elements similar to the first embodiment, previously described, are identified using identical references, and are not described again.

According to the second embodiment, the power supply system 10 comprises two circulation loops 14A, 14B for the alternating electric power, each loop being capable of being connected to a respective alternating electric power source 12A, 12B, the or each converter 16 being connected to the two circulation loops by toroids 18. The loop 14A is connected to the AC source 12A. The loop 14B is connected to the AC source 12B.

The operation of the second embodiment is similar to that of the first embodiment previously described, and will not be described again.

The advantages of the second embodiment are similar to those of the first embodiment previously described. The second embodiment further allows redundancy, each converter 16 being connected to two current sources 12A, 12B.

Figure 6:
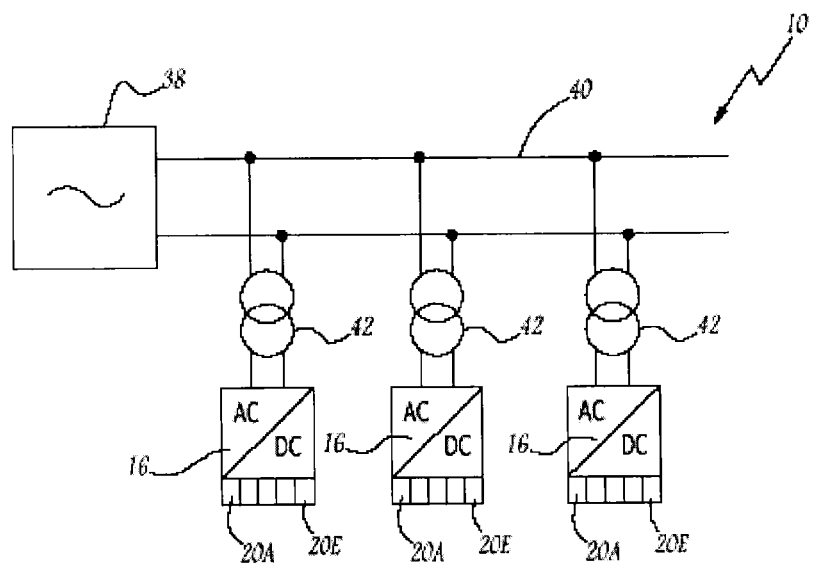
FIG. 6 is a view similar to that of FIG. 1 according to a third embodiment of the invention, the power supply system being connected to an alternating voltage source.

FIG. 6 illustrates a third embodiment of the invention in which the elements similar to the first embodiment, previously described, are identified using identical references, and are not described again.

According to the third embodiment, the power supply system 10 is connected to an alternating voltage source 38. A circulation bus 40 for the alternating electric power is connected to the alternating voltage source 38. Converters 16 are connected to the voltage bus 40 by voltage transformers 42.

The operation of this third embodiment is similar to that of the first embodiment previously described, and is not described again.

The advantages of this third embodiment are similar to those of the first embodiment previously described.

Figure 7:
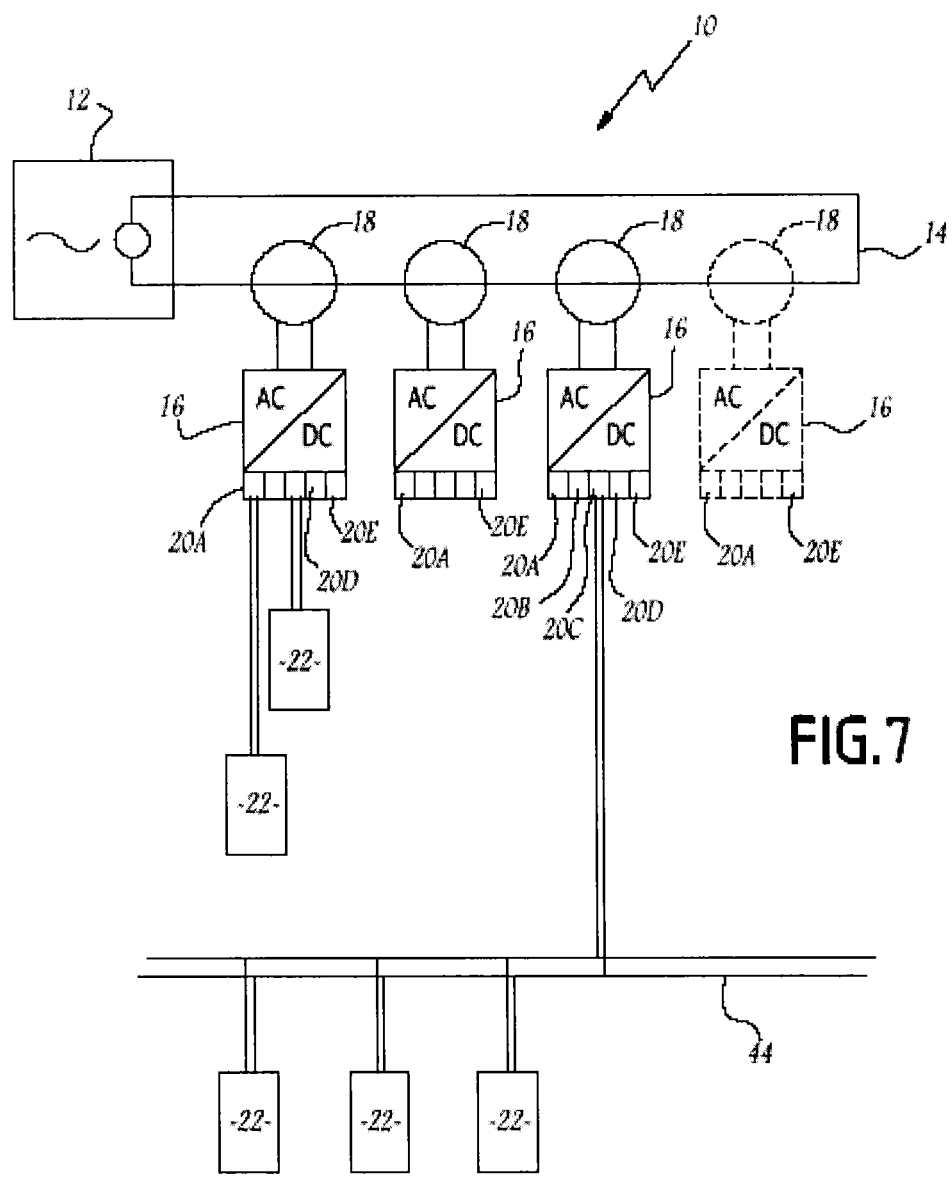
FIG. 7 is a view similar to that of FIG. 1 according to a fourth embodiment of the invention, the connection interfaces being able to be connected to multiple loads via a current bar.

FIG. 7 illustrates a fourth embodiment of the invention for which the elements similar to the first embodiment, previously described, are identified using identical references, and are not described again.

According to the fourth embodiment, the converters 16 include connection interfaces 20A, . . . , 20E adapted to be connected to multiple loads 22 via a current bar 44. All of the loads 22 connected to that current bar 44 start up at the same time, i.e., after expiration of the time delay selected for the connection interface 20A, . . . , 20E to which the current bar 44 is connected. It therefore suffices to connect all of the devices that must start up at the same time to the shared current bar 44.

Such a power supply system 10 is for example advantageous for a water distribution installation with Ethernet communications between different servers and Profibus and ADC communications that control the pumps with electric motors supplied with direct voltage and electrically controlled valves.

Another example of an installation in which such a power supply system 10 is advantageous is an intelligent power and motor control center (iPMCC).

The loads 22 powered by this power supply system 10 are for example communication systems for devices capable of generating data, such as circuit breakers, engine variable speed drives or engine protection relays. The loads 22 are also systems that only generate information streams such as communication switches, gateways or data loggers. The loads 22 are also control systems, such as programmable machines, and the control relays associated with them to drive other loads.

In an electric board, the diversity of current-related needs is considerable, whether direct or alternating, with a voltage level for example equal to 24 V, 48 V, 110 V or 240 V. The power supply system 10 according to the invention then allows very easy management of that diversity, for example with two alternative embodiments. According to a first alternative, each power converter 16 is for example suitable for providing a respective voltage between its output terminals. According to a second alternative, the voltage of each output terminal of the converter 16 is adjustable by the operator.

The invention claimed is:

1. A system for supplying direct electric power to at least two loads from an alternating electric power source, the system comprising:
   a circulation bus for the alternating power configured to be connected to the alternating power source;
   at least one converter configured to convert alternating power into direct power, the converter connected to the circulation bus;
   at least two connection interfaces, each connection interface being connected to a corresponding converter and configured to be connected to at least one electric load to supply direct electric power for a corresponding load; and
   control circuitry configured to control the connection interfaces and to time-shift a start-up moment for the supply of direct power from a first one of the at least two interfaces to a second one of the at least two interfaces.

2. The system according to claim 1, wherein the alternating electric power source is an AC source, and each converter is connected to the circulation bus by a current transformer.

3. The system according to claim 1, wherein the alternating electric power source is an alternating voltage source, and each converter is connected to the circulation bus by a voltage transformer.

4. The system according to claim 1, wherein the connection interfaces comprise at least one controllable switch and the control circuitry is configured to control the closing of the at least one controllable switch.

5. The system according to claim 4, wherein the control circuitry is configured to send a closing signal to the at least one controllable switch based on the received power supply start-up signal.

6. The system according to claim 5, wherein the closing signal controls a time delay circuitry specific to each respective connection interface.

7. The system according to claim 5, further comprising:
   an alternating electric power source configured to emit the power supply start-up signal.

8. The system according to claim 5, wherein the power supply start-up signal is a wireless signal, and the control circuitry includes a wireless receiver.

9. The system according to claim 5, wherein the power supply start-up signal is an electric power signal transmitted via the circulation bus of the alternating electric power.

10. The system according to claim 1, further comprising:
    two circulation buses for the alternating electric power configured to be connected in parallel to two alternating electric power sources, the at least one converter being connected to the two circulation buses.

11. The system according to claim 1, wherein the connection interfaces are configured to be connected to multiple loads using a current bar.

12. A method for starting up a direct electric power supply system for at least two loads, the direct electric power supply system including an alternating electric power circulation bus, at least one converter configured to convert alternating power into direct power, at least two connection interfaces being connected to a corresponding converter and being configured to be connected to at least one electric load to supply direct power to a corresponding load, the method comprising:
    starting circulation of alternating electric power in the alternating electric power circulation bus;
    time-shifting a startup moment of the direct power supply from a first one of the at least two interfaces to a second one of the at least two interfaces, the shift being controlled by control circuitry.

13. A system for supplying direct electric power to at least two loads from an alternating electric power source, the system comprising:
    a circulation bus for the alternating power adapted to be connected to the alternating power source;
    at least one converter for converting alternating power into direct power, connected to the circulation bus;
    wherein the system comprises
    at least two connection interfaces, each connection interface being connected to a corresponding converter and being adapted to be connected to at least one electric load to supply direct electric power for the or each corresponding load; and control means for controlling the connection interfaces, the control means being capable of time-shifting the start-up moment for the supply of direct power from one interface to the other, wherein the connection interfaces comprise at least one controllable switch and the control means are capable of controlling the closing of the or each controllable switch, wherein the control means are capable of sending a closing signal to the or each switch based on the received power supply start-up signal, and wherein the power supply start-up signal is a wireless signal, and the control means include a wireless receiver.

* * * * *